United States Patent
Siraky et al.

(10) Patent No.: US 9,671,251 B2
(45) Date of Patent: Jun. 6, 2017

(54) RELUCTANCE CHAIN SENSOR AND METHOD OF MEASURING THE CHAIN ELONGATION

(71) Applicant: IWIS Antriebssysteme GmbH & Co. KG, Munich (DE)

(72) Inventors: Josef Siraky, Donaueschingen (DE); Peter Kreisfeld, Winkelhaid (DE); Florian Madlener, Munich (DE)

(73) Assignee: IWIS ANTRIEBSSYSTEME GMBH & CO., KG, Munich (DE)

( * ) Notice: Subject to any disclaimer, the term of this patent is extended or adjusted under 35 U.S.C. 154(b) by 273 days.

(21) Appl. No.: 14/621,186

(22) Filed: Feb. 12, 2015

(65) Prior Publication Data
US 2015/0226582 A1    Aug. 13, 2015

(30) Foreign Application Priority Data

Feb. 13, 2014   (EP) ..................................... 14000520
Jan. 21, 2015   (EP) ..................................... 15000167

(51) Int. Cl.
*G01B 7/14* (2006.01)
*G01D 5/20* (2006.01)
*G01M 13/00* (2006.01)

(52) U.S. Cl.
CPC ............. *G01D 5/20* (2013.01); *G01D 5/2013* (2013.01); *G01M 13/00* (2013.01)

(58) Field of Classification Search
CPC ........................................................ G01B 7/14
USPC .................................................. 324/207.15
See application file for complete search history.

(56) References Cited

U.S. PATENT DOCUMENTS

| 5,291,131 A | 3/1994 | Suzuki et al. | |
|---|---|---|---|
| 6,356,848 B1 * | 3/2002 | Cote et al. ...................... | 702/44 |
| 7,540,374 B2 | 6/2009 | Rathbun et al. | |
| 2014/0156221 A1 * | 6/2014 | Bertolotti et al. ............ | 702/151 |

FOREIGN PATENT DOCUMENTS

| DE | 2709233 A1 | 9/1978 |
|---|---|---|
| DE | 4339595 C1 | 1/1995 |
| EP | 1464919 A1 | 10/2004 |
| WO | 2013113764 A1 | 8/2013 |

OTHER PUBLICATIONS

Thalhammer et al., Partial Translation of the Specification of DE4339595, Jan. 1995.*
Thalhammer et al., Partial Translation of the Claims of DE4339595, Jan. 1995.*

* cited by examiner

*Primary Examiner* — Bot Ledynh
(74) *Attorney, Agent, or Firm* — Baker and Hostetler LLP

(57) ABSTRACT

A chain sensor comprising at least one coil and a device for measuring the chain elongation comprising two chain sensors and a control unit, are provided. In addition, a method of measuring the chain elongation of a chain with two chain sensors arranged along the chain in spaced relationship with one another is provided. The chain sensor comprises at least one first reluctance sensor. The first reluctance sensor has a magnetically conductive yoke body comprising a central leg and two yoke legs extending laterally thereto. The yoke legs are each provided with at least two teeth, the teeth of the yoke legs being adapted to be arranged in closely spaced relationship with a chain. The first reluctance sensor includes at least one permanent magnet.

18 Claims, 6 Drawing Sheets

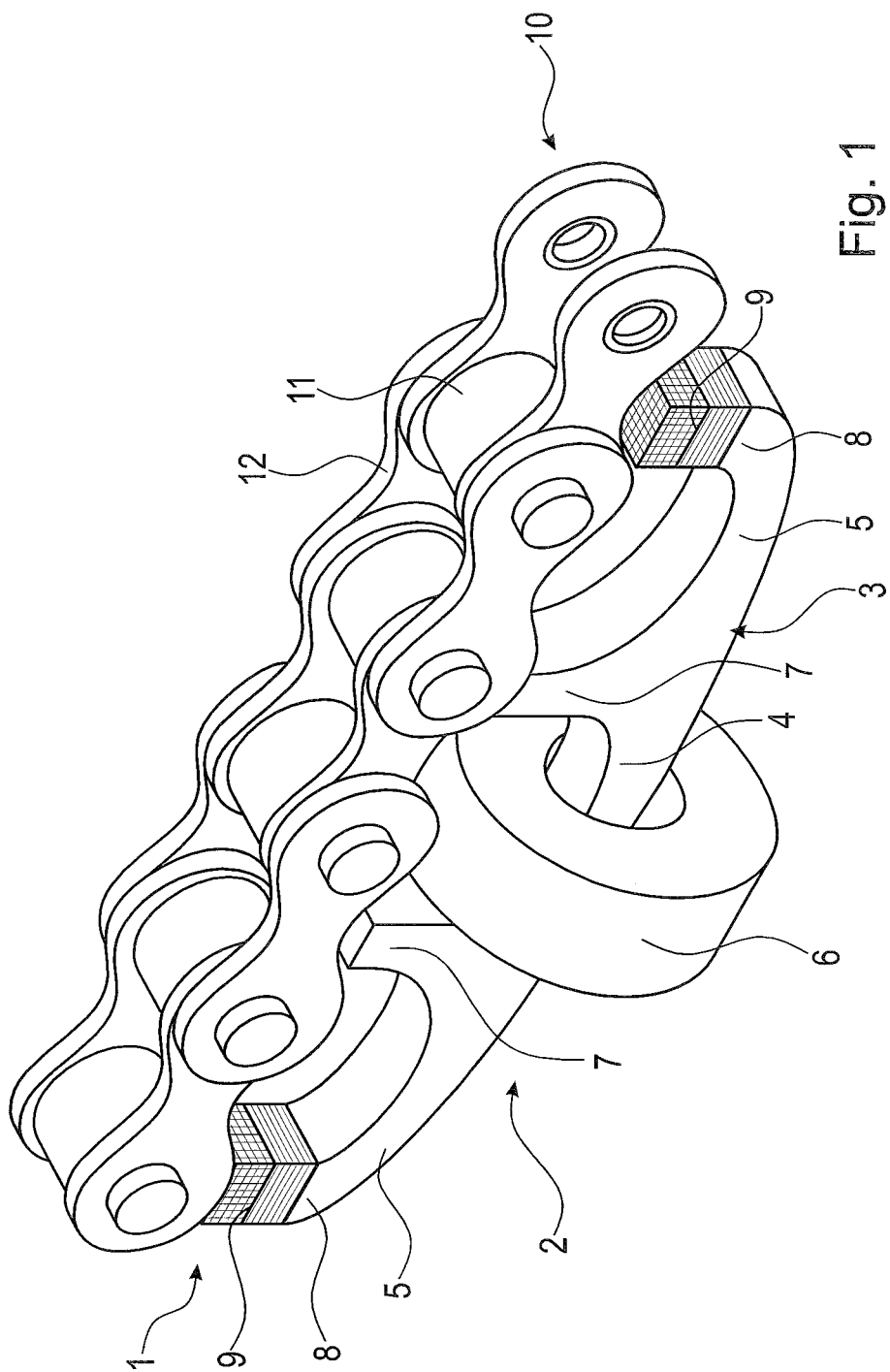

RELUCTANCE CHAIN SENSOR AND METHOD OF MEASURING THE CHAIN ELONGATION

CROSS-REFERENCE TO RELATED APPLICATION

This application claims priority to foreign European patent application No. EP 14000520.8, filed on Feb. 13, 2014, and to foreign European patent application No. EP 15000167.5, filed on Jan. 21, 2015, the disclosures of which are incorporated by reference in their entireties.

FIELD OF THE INVENTION

The present invention relates to a chain sensor comprising at least one coil as well as to a device for measuring the chain elongation comprising two chain sensors and a control unit. In addition, the invention relates to a method of measuring the chain elongation of a chain with two chain sensors arranged along the chain in spaced relationship with one another.

BACKGROUND

Chain drives, in particular those based on roller chains, are used for the purpose of driving and conveying in industrial applications, wherein a plurality of chain strands being used in various fields of application. A chain drive unit normally comprises an endlessly circulating chain deflected around a plurality of spaced apart chain wheels and a plurality of driving or conveying elements actuated by means of the chain or connected to the chain. Drive chains are, in operation, subject to wear through the relative movement of the individual components in the chain hinge and to other various chain elongation factors, such as initial elongation, stretching, bearing slackness and bearing abrasion. These wear and elongation factors result in an elongation of the chain and, in the end, lead to a failure of the drive unit. Wear of a chain also depends on the drive unit in which the chain is used, on the loads acting on the chain and on the surroundings in which it is operated. Hence, chain wear and, consequently, the failure of the drive unit cannot be predicted with certainty.

Within the framework of modern factory automation, machines and systems are increasingly configured as fully automatic means and, consequently, complex chain drives are used to an increasing extent. The high investment cost of such fully automated machines and systems necessitates the constant use of the latter with the least possible number of inadvertent downtimes. Such inadvertent downtimes lead not only to direct financial losses but also to indirect problems, such as the interruption of the logistics chain and even an incapability of observing delivery times, and thus to further financial losses. However, the use of wear-prone chain drives cannot be dispensed with in the foreseeable future, since there is no alternative that could be used for driving such industrial systems and for conveying products.

In addition, even minor wear of the drive chains in automated machines and industrial plants necessitates a manual readjustment of sequences of operations that are synchronized with the chain position.

Since it is neither possible to dispense with the use of drive chains nor to avoid or precisely determine the wear and the chain elongation of the drive chain, the condition of the drive chain must be regularly monitored so as to allow a systematic readjustment of the synchronized sequences of operations and so as to be able to plan and execute inspections and replacement of a worn drive chain in good time.

A suitable method of monitoring the elongation of a circulating drive chain is known from U.S. Pat. No. 5,291,131. Here, the drive chain has provided thereon two marks, which are spaced apart in the longitudinal direction of the chain and the position of which is detected, during operation, by two inductive or optical sensors which are also arranged in spaced relationship with one another. The speed of circulation of the chain as well as the chain elongation can be determined from the measurement values of the two sensors via a data acquisition means connected thereto. Reference EP 1 464 919 A1 describes a similar method of monitoring the wear of a drive chain. To this end, opposed sides of the chain have provided thereon two markers of magnetic material, which, when passing two inductive sensors, cause an electric signal to be generated. The sensors are arranged in spaced relationship with one another on opposed sides of the drive chain such that, initially, the sensors are triggered simultaneously. As soon as there is a time delay between the triggering of the sensors due to wear elongation of the chain, said wear elongation of the chain can be determined through a positional displacement of the sensors. Another device for measuring the wear elongation of a drive chain by means of two optical sensors is described in U.S. Pat. No. 7,540,374 B2. Here, the first sensor detects the first chain hinge of a chain link and a second sensor determines the position and the distance of the second chain hinge. In addition, also the distance of a plurality of chain links at two spaced-apart measurement positions can be determined.

It is also known to determine the wear of a drive chain via the measurement of the force, the path or the angle of rotation of chain tensioners or of two rotary position sensors on the driving wheel and on the load wheel. However, a precondition for this is that, on the one hand, a chain tensioner is actually required or rotary position sensors can actually be used and, on the other hand, that these elements are then influenced by wear and chain elongation, respectively. In addition, the measurement depends on the total length of the chain in both cases, since in the case of a longer chain the absolute values of the path and of force progression are greater. Hence, such methods must be calculated and adjusted with respect to the respective case of use and with respect to the effect of the measurement results and, consequently, these methods cannot be applied generically. In addition, both said methods measure not only the direct wear-dependent chain elongation but also the wear of the chain wheels.

Depending on the respective sensors and measurement principle used, these devices and methods known from the prior art entail a plurality of different drawbacks. Conventional measurement systems with fixed distances between the sensors necessitate, for a precise measurement of chain elongation, a drive unit with a constant speed, and they react with measurement errors to irregularities in the drive system, e.g. a relative slip between the driving wheel and the drive chain. In addition, optical sensors are, in many cases of application, not suitable for practical use in driving and conveying systems, since the industrial surrounding conditions contribute, due to dust and dirt, to a possible failure or incorrect measurements of the optical sensors. Inductive sensors exhibit, in addition to a switching sensitivity in the direction of measurement, also an inherent switching sensitivity perpendicular thereto, so that inductive sensors are not only sensitive to vibration but they also tend to execute incorrect measurements.

SUMMARY OF THE INVENTION

Therefore, it is the object of the present invention to eliminate or reduce the drawbacks of the prior art devices and methods for monitoring a chain elongation caused by wear, and to provide to this end a suitable sensor and a measurement device as well as an improved method of measuring the chain elongation of a drive chain.

In the case of a chain sensor according to the present invention, at least one first reluctance sensor is provided, said reluctance sensor having a magnetically conductive yoke body comprising a central leg and two yoke legs extending laterally thereto, the at least one inductive coil being preferably arranged on the central leg, the yoke legs are each provided with at least two teeth, said teeth of the yoke legs being adapted to be arranged in closely spaced relationship with said chain, and said reluctance sensor further including at least one permanent magnet, preferably at least two permanent magnets, which are each arranged on a respective yoke leg and/or on different sides of said at least one coil. In addition, when at least two permanent magnets are used, it may make sense to position said permanent magnets symmetrically with respect to the central leg. The arrangement of the reluctance sensor in comparatively closely spaced relationship with one side of a chain—the yoke body may here be arranged parallel to the chain link plates of the chain and the projections or teeth of the laterally extending yoke legs extend preferably up to a point between the chain link plates—allows the formation of closed magnetic circuits via the reluctance sensor and the chain with a comparatively low reluctance, i.e. a low magnetic resistance.

For improving the magnetic conductivity of the reluctance sensor, the almost crescent-shaped yoke bodies may be configured such that they are easily permeable to the magnetic field of the developing magnetic circuits. They may e.g. consist of a magnetically soft iron core having a low magnetic resistance or minimum reluctance. The magnetic circuits induced via the at least one permanent magnet along the lateral yoke legs generate a voltage at the coil, e.g. on the central leg of the yoke body, only one of the closed magnetic circuits being conducted substantially via the coil, whereas the other closed magnetic circuit is short-circuited beyond the coil via the teeth of the associated yoke leg and the chain.

The chain sensor is in particular suitable for measuring the relative elongation and/or the speed of the chain. Upon determining the change of length of the chain, the temperature may additionally be taken into account so as to take into consideration different temperature levels in the calculation.

When the chain, in particular a link chain, moves along the reluctance sensor, the change from the chain hinge to the space between the individual chain hinges also leads to a change in the path exhibiting the lowest magnetic resistance to the closed magnetic circuits induced by the at least one permanent magnet on the lateral yoke legs. Hence, also the magnetic field applied via the respective coils will change so that, depending on the position and the speed of the chain, an alternating voltage will be generated at the coils of the chain sensors. In spite of its simple structural design, the reluctance chain sensor according to the present invention can easily be integrated in new production plants and conveyor systems and it can also be used for retrofitting existing plants without any effort. Due to its special structural design, the chain sensor is maintenance-free as well as resistant to water, oil, dirt, high temperatures as well as aggressive environmental conditions to which also the drive chain itself is resistant. In addition, reluctance chain sensors are independent of the type of chain as well as of marks on the chain. During operation, the chain sensor is able to recognize the drive chain independently and to determine the chain elongation irrespectively of the speed of the drive chain. The use of the chain sensor according to the present invention provides a reluctance sensor for measuring chain elongation, which is as such comparatively cost-efficient, and allows in addition easy monitoring of the wear of chain-driven conveyor systems and production plants at low cost.

For clearly separating the formation of the two closed magnetic circuits, at least two permanent magnets can be provided, said permanent magnets being preferably arranged on the outer teeth of the yoke legs of the first reluctance sensor. The arrangement of the two permanent magnets on the outer teeth of the yoke legs, preferably on the tips of the outer teeth, permits not only simple mounting of the permanent magnets on the magnetically conductive yoke body, which consists e.g. of a magnetically soft material, but also a reliable transfer of the field lines of the closed magnetic circuits to the chain hinge. In addition, this arrangement of the at least two permanent magnets prevents an inadvertent short circuit of the magnetic circuit via the yoke leg carrying the respective permanent magnet. Although an arrangement of the at least two permanent magnets on the tips of the outer teeth has technical advantages as regards the formation of the magnetic circuits, it may, for operational purposes, make more sense to arrange the permanent magnets in spaced relationship with the tips or to provide some external protection so as to prevent the permanent magnets from being damaged if the chain should wobble during operation. Alternatively, the two magnets may also be positioned in the area of the lateral yoke legs.

In order to allow closed magnetic circuits having field lines that are clearly separated from one another, the permanent magnets arranged on the yoke legs may have identical pole directions in the direction of the central leg. The distinct formation of the two closed magnetic circuits allows a distinct signal at the at least one coil. When the at least one coil is arranged on the central leg, an AC voltage can be induced at the coil, since the closed magnetic circuits are conducted via the coil alternately and in different directions.

Alternatively, the at least one coil may be arranged on one of the teeth of the yoke legs. When the at least one or the plurality of coils is arranged on the teeth of the yoke legs, the reluctance sensor can be produced more easily, since the coils can be prefabricated and since it will then only be necessary to arrange them, i.e. push them onto the teeth of the yoke legs when carrying out the assembly operation. By arranging a plurality of coils on a respective one of the teeth of the yoke legs, the signals of the reluctance chain sensor can be broadened and differentiated, whereby additional possibilities are provided for calculating the relative change of length and/or the speed of the chain.

According to an expedient embodiment, a second reluctance sensor is provided, also said second reluctance sensor has a magnetically conductive yoke body comprising a central leg and two yoke legs extending laterally thereto, each yoke leg is provided with two teeth facing the chain, said teeth being adapted to be arranged in closely spaced relationship with the chain and facing the first reluctance sensor. The use of a second reluctance sensor, which may also be configured without a second coil and without permanent magnets, allows, independently of the design of the chain, a more uniform formation of the two closed magnetic circuits, provided that the coil is positioned on the central leg, and a more regular change of the magnetic field flowing through the at least one coil, so that, depending on the speed of the chain, a comparatively uniform, recurring AC voltage will be applied to the at least one coil.

Preferably, the second reluctance sensor may have arranged thereon a second coil, and the inductive coils on the first and second reluctance sensors may be disposed in parallel or in series. The second coil on the reluctance sensor not only amplifies the measurement signal of the chain sensor but makes it also possible to render the measurement signal more uniform and to reduce measurement errors. In addition, the second reluctance sensor may also be provided with two permanent magnets, each of said permanent magnets being arranged on one of the two laterally extending yoke legs and intensifying the magnetic fields in the chain sensor.

According to a special embodiment, the lateral yoke legs of the first and second reluctance sensors are each provided with a permanent magnet, the permanent magnets being preferably arranged on the respective outer teeth of the yoke legs, i.e. on the tips thereof, and the permanent magnets on the yoke legs of the first reluctance sensor have an identical pole direction, whereas the permanent magnets on the yoke legs of the second reluctance sensor have an inverse pole direction. Irrespectively of the possibility of providing two permanent magnets preferably on the outer teeth of the yoke legs of the first reluctance sensor, it is, due to the fact that the permanent magnets of the first reluctance sensor and of the second reluctance sensor, respectively, are oriented in the same pole direction, accomplished that the field lines of the two closed magnetic circuits extend in the same direction through the inner teeth, the mutual influence of the two closed magnetic circuits on each other being thus kept small. In addition, the optional second coil on the second reluctance sensor is flown through in the same manner, but in different directions, by the respective active magnetic circuit and will thus be able to amplify the signal of the at least one coil on the first reluctance sensor and to render it more uniform.

In accordance with another embodiment of the reluctance chain sensor according to the present invention, used for an articulated chain with a uniform pitch between the chain hinges, the at least one first reluctance sensor is arranged perpendicularly to the hinge axes of the chain hinges on one side of the articulated chain, the teeth of the yoke legs of the first reluctance sensor facing the articulated chain. Due to this arrangement of the at least one first reluctance sensor, the field lines of the two closed magnetic circuits extend perpendicularly to the hinge axes. The perpendicular arrangement of the first reluctance sensor allows a very small distance between the teeth of the lateral yoke legs and the chain hinges of the articulated chain, so that the magnetic resistance across this distance is as low as possible. For allowing the two magnetic circuits to form with the least possible interference and with maximum uniformity, a yoke exhibiting a low magnetic resistance may be provided on the opposite side of the articulated chain, which faces away from the first reluctance sensor, and the two closed magnetic circuits may extend via said yoke, whereby their formation is made more independent of interference on the part of the moving articulated chain.

In accordance with a variant of the chain sensor according to the present invention, a second reluctance sensor is provided, which is arranged perpendicularly to the hinge axes of the chain hinges on an opposite side of the articulated chain, the teeth of the yoke legs of said second reluctance sensor facing the articulated chain. Due to the arrangement of a second reluctance sensor on an opposite side of the articulated chain, the field lines of the two closed magnetic circuits extend perpendicularly to the hinge axes through the chain hinges and then via the yoke legs of the second reluctance sensor, so that the magnetic resistance or reluctance of the two closed magnetic circuits can be minimized. The distance between the associated teeth of the first and second reluctance sensors may here exceed the outer diameter of the chain hinges of the articulated chain by a maximum of 20%, preferably a maximum of 10%, in particular a maximum of 5%. The smaller the distance between the teeth of the first and second reluctance sensors and the distance between said teeth and the chain hinges of the articulated chain is, the lower the resistance to the magnetic circuits induced by the permanent magnets and the stronger the AC voltage signal induced at the coils will be.

According to an expedient embodiment, the distance between the outer tooth of one of the yoke legs and the inner tooth of the other yoke leg of the first or second reluctance sensor may amount substantially to an integer multiple of the pitch of the articulated chain. Making use of such a structural design of the yoke legs of the chain sensor, a uniform AC voltage can be generated at the at least one coil of the first reluctance sensor and, optionally, also at a second coil. With respect to manufacturing tolerances and the wear elongation of the articulated chain, a tolerance range of ±10% of the pitch will have to be taken into account for a substantially integer multiple.

According to a further aspect, the present invention relates to a device for measuring the chain elongation of a chain comprising at least two reluctance chain sensors, said chain sensors being arranged along the chain in spaced relationship with one another, and a control unit for receiving and processing the signals of the two chain sensors, the at least one coil provided on each chain sensor generating, in operation, an alternating signal of the voltage induced at the coil. Via the two sensor halves, the chain sensors can easily be arranged on the chain, which is normally a roller chain, without the necessity of providing marks on the chain itself or conducting the chain such that it passes through a sensor. The control unit connected to the chain sensors allows, in addition to mere monitoring of chain elongation and chain wear, also the detection of other operating parameters, e.g. operating hours, as well as the incorporation of safety functions, e.g. an alarm in the event that a predetermined value of wear should be exceeded, a stop function in the event of critical wear conditions, a protection mode with reduced speed from an increased value of wear onwards as well as a reliable detection of wear conditions and a compensation of chain elongation for relevant components. In addition, measurement values and control data can be transmitted via the control unit to a central processing computer or to production supervisors.

According to a special embodiment of the device, at least three chain sensors are provided. Making use of a third chain sensor, the movement of the chain can always be determined in a reliable manner, irrespectively of whether the distance between the two first reluctance chain sensors is precisely adapted the chain pitch.

For a reliable evaluation and an exact temporal allocation of the chain elongation measurement, a comparator for converting the alternating signals into square-wave signals can be provided for each chain sensor. The use of comparators allows through the differentiation of the alternating signal, i.e. the conversion of the alternating signal into a square-wave signal, an exact temporal allocation indicating at what time all the teeth of the yoke bodies have equally associated therewith the spaces between the chain hinges. The period of the square-wave signal is here inversely proportional to the speed of the chain. Hence, the distance of the switching pulses of the two chain sensors in relation to the period can provide an unequivocal measure for the chain length.

When the coil is optionally arranged on the central leg of the yoke body, an alternating signal with an alternating positive and negative voltage, i.e. an AC voltage, is generated at the coil during operation of the device through the movement of the chain along the chain sensors, since the two magnetic circuits of the reluctance sensor flow alternately in different directions through the coil on the central leg. By means of the comparator, these alternating signals can be converted into periodic square-wave signals, an exact temporal assignment of the chain or chain hinges to the square-wave signal being possible by means of the phase change of the AC voltage.

According to a special embodiment of the device, which is used for measuring the chain elongation of a chain and which comprises two reluctance chain sensors, the control unit utilizes the alternating signals or AC voltage for power supply, preferably for an autarkic power supply of the device. Due to the movement of the chain along the chain sensors and consequently through the two magnetic circuits of the sensors—which magnetic circuits flow either individually or both through the at least one coil according to the change of the chain hinges of the chain—a voltage or AC voltage, which can be utilized for operating the device, is generated at the coils of the chain sensors. Hence, the reluctance chain sensors also act as generators. The possibility of an autarkic power supply of the control unit and of associated components for data transmission and for visualizing measurement data allows a simple incorporation of such devices into existing machines and plants without interfering with the normally complex concept of the power supply of such existing machines and plants. By means of such a generic device, the condition of the operation of a chain can be detected also in existing plants at any time and an early warning or an automatic synchronization of the plant can be made possible in an autarkic manner. This aspect of the present invention could also be protected independently of the details of the reluctance chain sensors and the device for measuring the chain elongation according to the present invention and could be prosecuted independently. The use of chain sensors as generators for supplying power guarantees an autarkic mode of operation of respective measurement units.

According to a suitable embodiment of the device, an indicator device is provided for displaying the chain elongation of the chain. In addition to an easy readability of the chain wear length and of the operating condition of the drive chain, such an indicator unit can also be used for displaying further important operating and safety parameters, such as operating hour counters, warning functions and error indications. The indicator unit for displaying the chain elongation as well as the control unit can here be supplied autarkically via the chain sensors with the power required for operating the indicator unit.

According to a further embodiment, the device may additionally comprise temperature sensors, e.g. infrared temperature sensors, for determining the actual temperature of the chain and of the device. The temperature-dependent change in the length of the chain can thus be taken into account in the calculation of the change of length and the device in its entirety can determine even more reliably the change in the length of the chain caused by chain wear.

According to another potential addition, the device is provided with a shock sensor, i.e. an acceleration sensor. Via the shock or acceleration spectrum, which, when the chain enters the device, is created at the shock sensor used, the differences between the measurement values can be used e.g. for providing information on the lubrication state and the canting of chain hinges of the chain. Monitoring the chain condition by means of a shock sensor or an acceleration sensor is especially possible due to the fact that, in the case of an insufficiently lubricated or heavily worn chain, the chain links will not assume a straight orientation and may cause different deflections and/or a relative acceleration of the respective chain links, when the chain enters the device.

The present invention additionally relates to a method for measuring the chain elongation of a chain with at least two reluctance chain sensors which are arranged along the chain in spaced relationship with one another, each chain sensor comprising at least one coil and at least one permanent magnet, preferably at least two permanent magnets. This method comprises the steps of forming two closed permanent magnetic circuits of low magnetic resistance (reluctance) to the magnetic field lines via each chain sensor, wherein, depending on the position of the chain relative to the chain sensor, the two closed magnetic circuits are each conducted via the chain sensor in short-circuit state or wherein temporarily one or, alternately, both the closed magnetic circuits flow, at least partially, through the at least one coil and the other of the closed magnetic circuits is still conducted via the chain sensor in short-circuit state; moving the chain in a direction along the two chain sensors; periodically changing the magnetic circuits flowing at least partially through the at least one coil; and generating an alternating voltage signal at the coils of the two chain sensors. Since the position of the two closed magnetic circuits in the chain sensors depends on the position of the chain relative to the sensors, magnetic circuits will form according to the movement of the chain relative to the chain sensors, said magnetic circuits changing their position in the chain sensors in response to the position of the chain. Since the magnetic circuits induced by the permanent magnets endeavor to close the magnetic flux between the poles of the permanent magnets via a magnetic circuit with the lowest possible magnetic resistance or reluctance, a movement of the chain relative to the chain sensors also leads to a change in the position of the two magnetic circuits in the chain sensors and, consequently, also to a change in their position relative to the at least one coil.

The magnetic resistance or reluctance is the proportionality factor between the magnetic voltage and the magnetic flux and behaves in analogy with the electric resistance, which, according to Ohm's Law, represents the factor between electric voltage and electric current. With a suitable arrangement of the at least two permanent magnets in chain sensors, the two closed magnetic circuits can be configured such that one or both of them flow at least partially through the coil. Since, depending on the position of the chain links, the chain closes the magnetic circuits over different lengths via the coil or only in a short-circuit state via a yoke leg, a movement of the chain in a direction along the chain sensors leads to a periodic change of the magnetic circuits flowing at least partially through the coil. Since the respective magnetic circuit closed in a short-circuit state does not flow via the coil, the periodic change of the one or two closed magnetic circuits will lead to the generation of a voltage change, i.e. an AC voltage, at the coil. The maximum of the voltage is here a recurring characteristic for a specific position of the chain or chain hinges relative to the chain sensor at which the magnetic circuit conducted via the at least one coil has to overcome the lowest magnetic resistance, a condition which is normally given through the position of a chain hinge in the magnetic circuit, i.e. between the teeth of the yoke legs of the circuit.

An expedient further development of the method for measuring the chain elongation of a chain comprises the steps of differentiating the voltage signal and generating a separate square-wave signal for both chain sensors as well as determining the period of the square-wave signals of the chain sensors. By differentiating the voltage signal, e.g. by means of a comparator, a characteristic square-wave signal can be produced, by means of which an exact temporal assignment of the voltage change can be accomplished according to the change of the magnetic circuits flowing through the coil. The output of the comparator provides here a square-wave signal for evaluating the chain wear elongation whose period is inversely proportional to the speed of the chain.

Another further development of the method additionally comprises the following steps: determining the intervals in time between the switching signals of the respective square-wave signals of both chain sensors or the intervals in time between the switching thresholds, calculating a switching ratio on the basis of the interval in time of the switching thresholds in relation to the period of the square-wave signals and comparing the calculated switching ratio with a stored switching ratio for an initial condition of the chain, this comparison value being a measure for the relative chain elongation. The calculated switching ratio is here a direct, unequivocal measure for the chain elongation existing at the time in question in comparison with the initial condition. Depending on the respective desired evaluation algorithm, the interval between the switching pulses of the square-wave signals of both chain sensors can be correlated with the period of one of the chain sensors or with the averaged or added periods of both chain sensors. For documenting an initial condition of the chain, this switching ratio is recorded for a new chain for a certain period of time and stored as a comparison value. This original comparison value for a specific chain can then be used for calculating and illustrating the wear-dependent chain elongation of this chain. In addition, the comparison value between the calculated switching ratio and the initial condition of the chain can be used as a control variable for synchronizing the chain position with respect to other elements actuated by means of the chain so as to allow optimum operation of the driven device.

For unequivocally determining the direction of movement of the link chain, a third reluctance chain sensor may be provided. It is true that the direction of movement of the chain can also be recognized on the basis of an accurate positioning of only two chain sensors, but these two chain sensors must then be arranged such that they are unequivocally displaced by half a pitch and this unequivocalness of positioning must not get lost, not even in the case of chain elongation. By means of a third reluctance chain sensor, the direction of movement of the chain can always be detected in a reliable manner. To this end, the third chain sensor is arranged with an only small mechanical displacement, a small difference to an integer chain pitch, with respect to one of the first two chain sensors. Due to the small mechanical displacement, an unequivocal target signal, from which the direction of movement of the chain can reliably be recognized, can be obtained from the voltage signal of the third chain sensor after differentiation and formation of a square-wave signal by means of comparators.

BRIEF DESCRIPTION OF THE DRAWINGS

In the following, an embodiment of the present invention will be explained in more detail. The individual figures show:

FIG. 1 a perspective view of a chain sensor according to the present invention with a first reluctance sensor and an articulated chain;

DETAILED DESCRIPTION

Figure 1A:
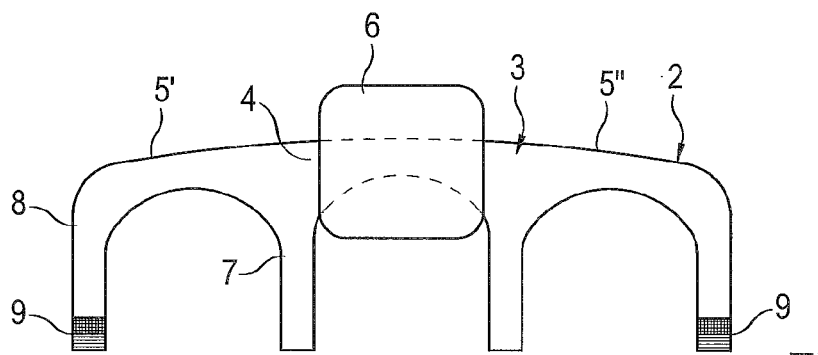
FIG. 1a a side view of the chain sensor according to the present invention shown in FIG. 1.

FIG. 1 shows a schematic representation of a chain sensor 1 according to the present invention with a first reluctance sensor 2 in a perspective view. The reluctance sensor 2 comprises a yoke body 3 consisting of a material that is magnetically conductive, i.e. permeable to magnetic fields, said yoke body 3 comprising in addition to a central leg 4 also two yoke legs 5 extending laterally of the central leg 4. The central leg 4 has arranged thereon a coil 6, which may extend over the entire length of the central leg 4 between the inner teeth 7 of the adjoining yoke legs 5. The yoke legs 5 have, in addition to the inner teeth 7 adjoining the central leg 4, also outer teeth 8 which are arranged on the respective outer ends of the yoke legs. The inner teeth 7 and the outer teeth 8 project relative to a central area of the yoke legs 5 in the direction of an articulated chain 10 so that a cavity is defined between the inner teeth 7 and the outer teeth 8 of the yoke legs 5 and the articulated chain 10, said cavity exhibiting, other than the magnetically conductive yoke body 3, a high magnetic resistance, i.e. a high reluctance, to the field lines of magnetic circuits.

The outer teeth 8 of the two yoke legs 5 each have provided thereon a permanent magnet 9. The permanent magnets 9 are arranged on the tips of the outer teeth 8 in the same pole direction, i.e. the free outer tips of the outer teeth 8 both exhibit the positive pole or, alternatively, the negative pole of the permanent magnets 9. The inner teeth 7 and the outer teeth 8 of the yoke legs 5 are oriented in the direction of the articulated chain 10, the reluctance sensor 2 and the field lines of the magnetic circuits 13, 14 of the permanent magnets 9 as well as the lateral surfaces of the yoke body 3 being oriented substantially perpendicularly to the hinge axes of the chain hinges 11 of the articulated chain 10. The respective tips of the inner teeth 7 and of the outer teeth 8 of the yoke legs 5 are spaced only at a small distance from the outer circumferential surface of the chain hinges 11 so that the articulated chain 10 can be moved along the reluctance sensor 2 in a substantially contact-free manner.

The permanent magnets 9 at the tips of the outer teeth 8 of the yoke legs 5 define two magnetic circuits 13, 14 whose field lines extend, according to Hopkinson's Law, along the lowest magnetic resistance or lowest reluctance. Depending on the position of the articulated chain 10, the coil 6 is here alternately flown through by one of the two closed magnetic circuits 13, 14, so that the coil 6 will generate a characteristic voltage signal. In order to eliminate in the voltage signal, optimally in an AC voltage signal, on the coil 6 constructional interference caused by the articulated chain 10 and/or in order to amplify the voltage signal in the case of a high magnetic resistance of the chain link plates 12 of the articulated chain 10, an additional magnetically conductive body may be arranged on the side of the articulated chain 10 located opposite the reluctance sensor 2, said additional body being preferably a body with projections arranged complementarily to the inner teeth 7 and the outer teeth 8 of the yoke body 3 of the first reluctance sensor 2, or a second reluctance sensor 2' with or without a second coil 6', so as to close the magnetic circuits 13, 14, which are induced by the permanent magnets 9, via the chain hinges 11 of the articulated chain 10 with low reluctance.

Figure 1B:
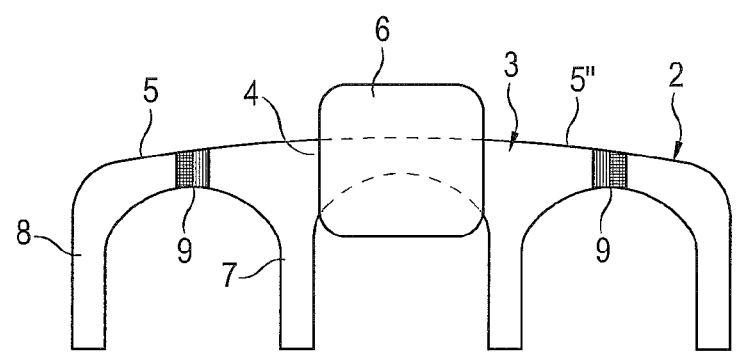
FIG. 1b a side view of an alternative embodiment of a chain sensor according to the present invention.

The chain sensor 1 configured as a reluctance sensor 2 and shown in FIG. 1a comprises two permanent magnets 9 at the respective tips of the outer teeth 8 of the yoke leg 5, the respective pole direction being identical. Alternatively, the permanent magnets 9 may be positioned at a distance from the tips of the outer teeth 8 so as to protect, in operation, the permanent magnets 9 more effectively against wear and damage. The inductive coil 6 is arranged between the lateral yoke legs 5 on the central leg 4 of the yoke body 3 and is alternately flown through by one of the magnetic circuits 13, 14, which depend on the position of the articulated chain 10 and which are closed via the yoke body 3, so that the coil 6 generates a characteristic voltage signal. FIG. 1b shows an alternative embodiment of the reluctance sensor having an inductive coil 6 arranged on the central leg 4, the permanent magnets 9 being here arranged in the area of the lateral yoke legs 5 of the magnetically conductive yoke body 3. Also in this case, the respective pole directions are oriented identically in the direction of the outer teeth 8 and the inductive coil 6, respectively.

Figure 1C:
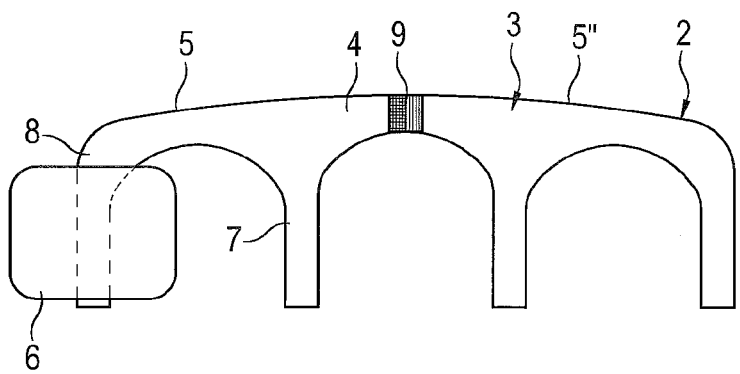
FIG. 1c a side view of another embodiment of a chain sensor according to the present invention.

A structurally different embodiment of the reluctance sensor 2 is shown in FIGS. 1c and 1b. In these embodiments, the inductive coil 6 is arranged on one of the outer teeth 8 of the yoke legs 5. In the case of these embodiments, a prefabricated coil can be positioned on the outer teeth 8 and/or inner teeth 7, whereby the comparatively complicated winding of a coil around the central leg 4 of the yoke body 3 can be avoided. The inductive coil 6 can here be positioned on one of the outer teeth 8 as well as one of the inner teeth 7 of the yoke body 3. In order to obtain a higher efficiency and/or additional alternating signals, several or all the inner teeth 7 and outer teeth 8 may be provided with an inductive coil 6. The arrangement of one or more inductive coils on the inner teeth 7 and the outer teeth 8 of the yoke body 3 necessitates also the arrangement of the at least one permanent magnet 9 on the yoke legs 5 or the central leg 4 of the yoke body 3 or on one or more of the free inner teeth 7 or outer teeth 8. As shown in FIG. 1c, it will, in this embodiment, suffice to use one permanent magnet 9 and arrange it e.g. on the central leg 4. Alternatively, also two permanent magnets 9 may be arranged on the yoke legs 5 of the yoke body 3 or on the inner teeth 7 or the outer teeth 8 of the yoke legs 5. The use of two permanent magnets on the yoke legs 5 will not only intensify the magnetic field, i.e. the field lines of the magnetic circuits 13, 14, but it will also allow the formation of two closed magnetic circuits 13, 14 having similar field strengths.

Figure 2A:
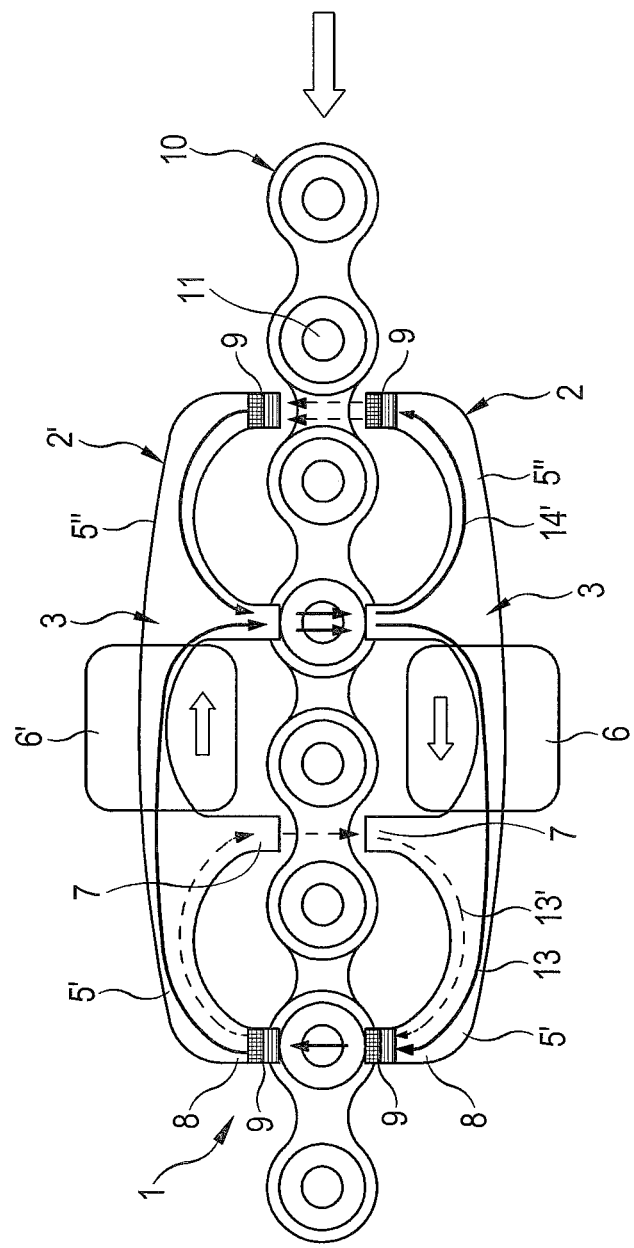
FIG. 2a a side view of a chain sensor according to the present invention with two reluctance sensors on opposite sides of an articulated chain at a first position.

FIG. 2a shows a preferred embodiment of a reluctance chain sensor 1 according to the present invention comprising two reluctance sensors 2, 2', which are arranged on the upper and lower sides of the articulated chain 10 perpendicularly to the hinge axes of the chain hinges 11. Both reluctance sensors 2, 2' are here provided with an inductive coil 6, 6', the respective coil 6, 6' being arranged on the central leg 4 of the yoke body 3. The articulated chain 10 can pass between the two reluctance sensors 2, 2' in a substantially contact-free manner or at least such that the frictional resistance will be low, the distance between the associated outer teeth 8 and inner teeth 7 of the two reluctance sensors 2, 2' being only slightly larger than the outer diameter of the chain hinges 11, so that the reluctance between the individual pairs of outer teeth 8 and inner teeth 7 will be as low as possible when a chain hinge 11 passes between the respective pairs of teeth.

The reluctance sensors 2, 2' of the chain sensor 1 in FIG. 2a are provided with two permanent magnets 9 on the respective tips of the outer teeth 8, the pole directions of the permanent magnets 9, which are disposed on the individual reluctance sensors 2, 2' and oriented towards the articulated chain 10, being identical but different from those of the permanent magnets 9 disposed on the respective other reluctance sensors 2, 2'. Hence, the pole directions of the associated permanent magnets 9 on the outer teeth 8 are different from one another, so that a respective magnetic circuit 13, 14 is formed via each of the two permanent magnets 9 associated with one another. It follows that the respective magnetic circuits 13, 14 extend over both reluctance sensors 2, 2'. Depending on the position of the chain hinges 11, the articulated chain 10 will differently short-circuit, also with different reluctances, the magnetic circuits 13, 14 between the yoke bodies 3 of the reluctance sensors 2, 2'.

At the position of the articulated chain 10 shown in FIG. 2a, the magnetic circuit 13 is closed via the left-hand yoke legs 5' of the reluctance sensors 2, 2', i.e. it is closed via the chain hinge 11 of the articulated chain 10 positioned between the permanent magnets 9 at the tips of the outer teeth 8, the left-hand yoke legs 5' and the central legs 4 of the reluctance sensors 2, 2' as well as via the inner teeth 7 of the right-hand yoke legs 5" and the chain hinge 11 positioned between the inner teeth 7. The magnetic field of the magnetic circuit 13 also flows through the coils 6, 6' on the central legs 4 of the reluctance sensors 2, 2' in the direction indicated by the solid arrows in FIG. 2a. In spite of the longer path for the field lines of the magnetic circuit 13 and the resistance during flow through of the inductive coils 6, 6', the main part of the field lines of the magnetic circuit 13 extends, at this position of the articulated chain 10, via the inner teeth 7 of the right-hand yoke legs 5" and consequently also via the inductive coils 6, 6', since the magnetic resistance is higher when the magnetic circuit 13 is short-circuited via the left-hand yoke legs 5' of the reluctance sensors 2, 2' via the shorted circuit 13'. Between the inner teeth 7 of the left-hand yoke legs 5' there is a chain gap, i.e. the space between two chain hinges 11, at the position of the articulated chain 10 shown in FIG. 2a, so that the field lines can here only be transmitted via the large air gap of the chain gap between the inner teeth 7 and partially via the narrow lateral chain link plates 12 of the articulated chain 10, i.e. they can only be transmitted with a correspondingly high magnetic resistance. In spite of the much higher magnetic resistance between the inner teeth 7 of the left-hand yoke legs 5', also a lower magnetic flux flows through the shorted magnetic circuit 13' via the left-hand yoke legs 5' in accordance with Hopkinson's Law.

The permanent magnets 9 at the tips of the outer teeth 8 of the right-hand yoke legs 5" generate, in spite of the magnetic resistance through the chain gap, a further magnetic field between the permanent magnets 9 on the outer teeth 8, viz. the second permanent magnetic circuit 14, which is closed via the chain hinge 11 between the inner teeth 7 of the right-hand yoke legs 5" as a shorted magnetic circuit 14' and which thus extends substantially only via the right-hand yoke legs 5" of the two reluctance sensors 2, 2'.

When the articulated chain 10 moves in the chain running direction indicated by the contoured arrow in FIG. 2a, also the position of the chain hinges 11 relative to the pairs of inner teeth 7 and outer teeth 8 of the left-hand and right-hand yoke legs 5', 5" changes and, consequently, also the formation of the magnetic circuits 13, 14. In response to an increase of reluctance between the inner teeth 7 of the right-hand yoke legs 5" and a simultaneous decrease of reluctance between the inner teeth 7 of the left-hand yoke legs 5', the magnetic flux migrates from the magnetic circuit 13 through the coils 6, 6' towards the shorted magnetic circuit 13' until substantially the whole magnetic flux flows via the shorted magnetic circuit 13'.

Figure 2B:
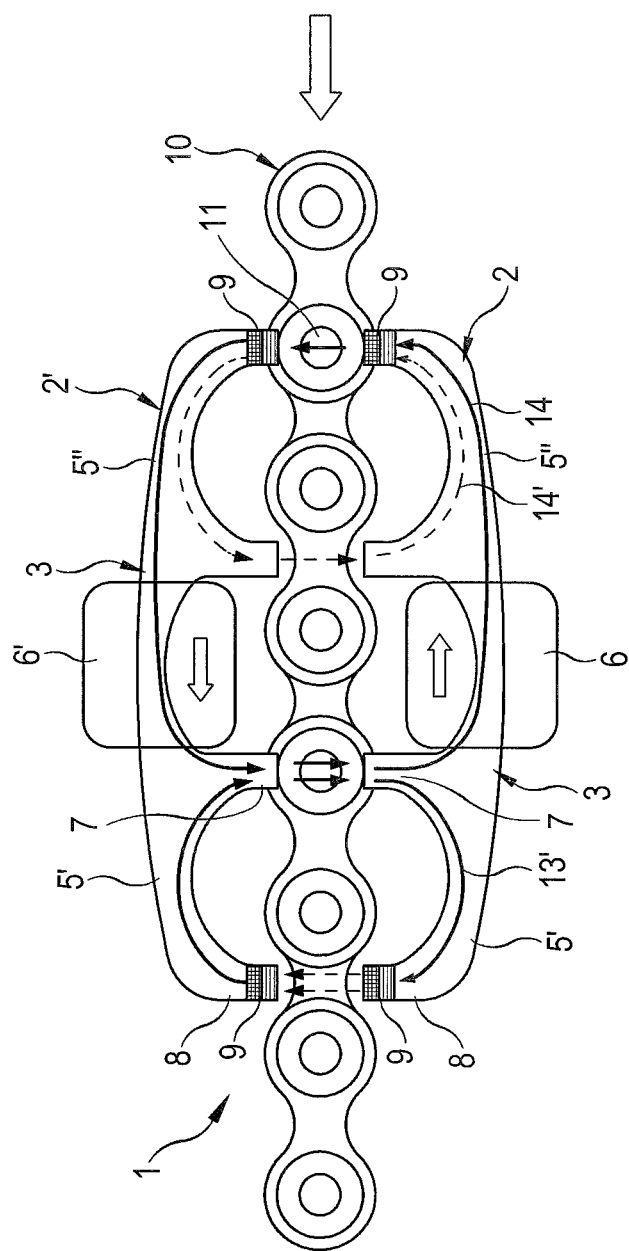
FIG. 2b a side view of a chain sensor according to the present invention with two reluctance sensors on opposite sides of an articulated chain at a second position.

FIG. 2b shows the chain sensor 1, which has already been shown in FIG. 2a, said chain sensor 1 comprising two reluctance sensors 2, 2' arranged perpendicularly to the hinge axes of the chain hinges 11 above and below the articulated chain 10. In contrast to the preceding representation of the chain sensor 1, the articulated chain 10 shown in FIG. 2b has been advanced by half a pitch of the chain hinges 11 in the chain running direction. Due to this new position of the articulated chain 10, the magnetic circuit 14 is now closed via the inner teeth 7 of the left-hand yoke leg 5', the magnetic circuit 14 extending from the permanent magnets 9 on the tips of the right-hand outer teeth 8—between which a chain hinge 11 that minimizes the magnetic resistance to the field lines of the magnetic circuit 14 is located at this position of the articulated chain 10—via the right-hand yoke legs 5", the central legs 4 and the inner teeth 7 of the left-hand yoke legs 5' of the upper and lower reluctance sensors 2, 2' as well as the chain hinge 11 of the articulated chain 10 positioned between the inner teeth 7 of the left-hand yoke legs 5'. The magnetic circuit 14 induced by the permanent magnets 9 flows here through the inductive coils 6, 6' on the central legs 4 of the reluctance sensors 2, 2' in a direction opposite to the magnetic field direction shown in FIG. 2a. Also in this case, a shorted magnetic circuit 14' forms via the right-hand yoke legs 5", the magnetic flux of this shorted magnetic circuit 14' being inversely proportional to the magnetic resistance of the shorted magnetic circuit 14' via the inner teeth 7 of the right-hand yoke legs 5".

The chain sensor 1 shown in FIGS. 2a and 2b can equally be used with a single reluctance sensor 2 whose respective magnetic circuits 13, 14 close via the articulated chain 10. In addition, the other embodiments of the reluctance sensor 2 according to FIGS. 1b to 1d can be used equally. When only one permanent magnet 9 is used on the central leg 4 according to the embodiment of the reluctance sensor 2 in FIG. 1c, two magnetic circuits 13, 14 with very different magnetic fluxes according to the different reluctances along these magnetic circuits 13, 14 are obtained via the outer teeth 8 and the inner teeth 7 of the yoke body 3.

When the articulated chain 10 passes with a continuous movement in the direction of the chain running direction, indicated in FIGS. 2a and 2b by the contoured arrow, between the two reluctance sensors 2, 2' of the chain sensor 1 according to the present invention, the inductive coils 6, 6' are alternately flown through by the magnetic circuits 13, 14, so that an AC voltage is generated at the coils 6, 6'. Depending on the demands on the alternating signal, the coils 6, 6' of the reluctance sensors 2, 2' may here be disposed in series or in parallel.

The AC voltage applied to the inductive coils 6, 6' of the reluctance sensors 2, 2' reaches its maximum when chain hinges 11 of the articulated chain 10 are positioned between the respective inner teeth 7 and outer teeth 8 of the respective magnetic circuits 13, 14, which means that the magnetic resistance or reluctance of the magnetic circuits 13, 14 will be lowest. Since, due to the chain elongation caused by wear, the AC voltage signal applied to the inductive coils 6, 6' changes during operation of the articulated chain 10, a more precise temporal assignment of the signal to the position of the articulated chain 10 can be made possible by differentiating the alternating signal. For differentiating the alternating signal, e.g. comparators 15 may be used, by means of which a noise superimposed on the AC voltage can be filtered out or an only small edge steepness of the AC voltage can be compensated for. In addition, comparators 15 can prevent the signal voltage from changing over too often and in an irregular manner. By means of such comparators 15, a distinct square-wave signal for evaluating the chain wear elongation is obtained from the originally induced AC voltage. The period of the square-wave signal is here inversely proportional to the speed of the articulated chain 10.

Figure 3:
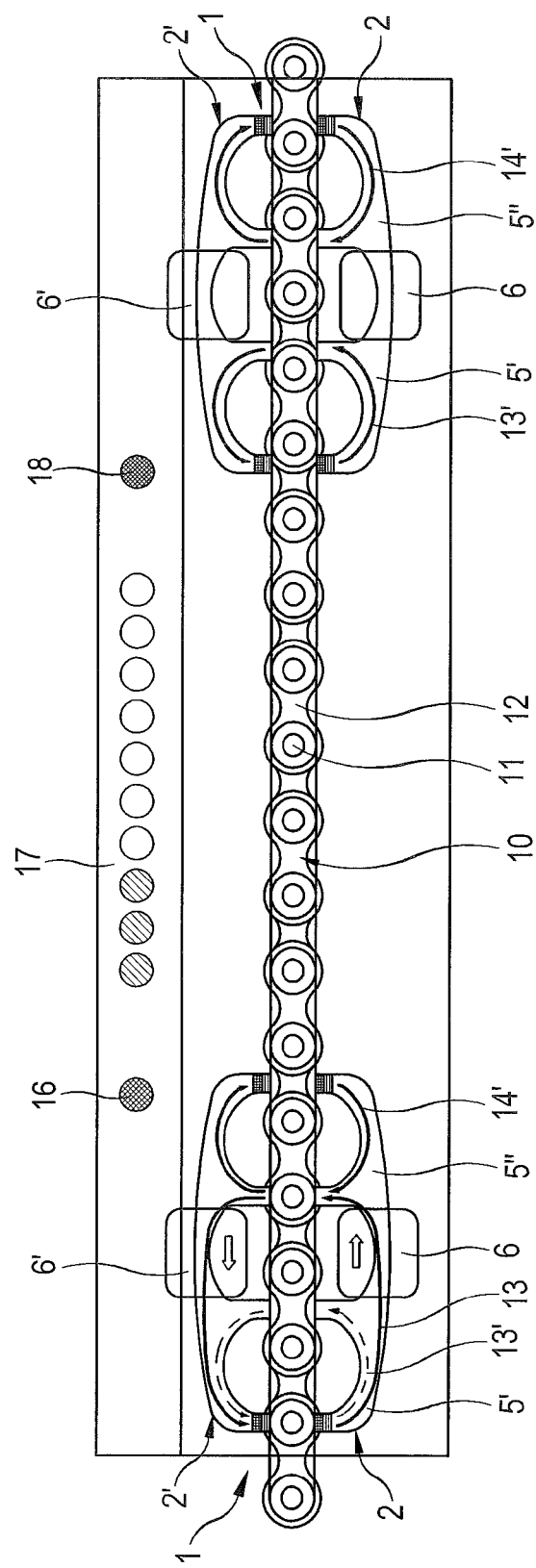
FIG. 3 a device for measuring the chain elongation of a chain with two chain sensors according to FIG. 2A and FIG. 2B.

A device according to the present invention used for measuring the chain elongation of an articulated chain 10 and comprising two chain sensors 1, which are arranged in spaced relationship with one another and which have the articulated chain 10 conducted therethrough in the operating condition, is shown in FIG. 3. In this device a plurality of indicator devices is additionally provided, an operation indicator 16, a multi-stage wear indicator 17 as well as an emergency indicator 18. In a simple embodiment, these indicators may be configured as colored light-emitting diodes. The entire device for measuring the chain elongation of the articulated chain 10 may here be configured as a compact structural unit that can easily be installed also on already existing plants comprising drive chains.

The representation of the device according to the present invention in FIG. 3 also shows the magnetic circuits 13, 14 via the two chain sensors 1. The position of the articulated chain 10 relative to the chain sensor 1 provided on the left side of the device in FIG. 3 allows the permanent magnetic circuit 13 to be closed via the coils 6, 6' as well as the magnetic circuit 14' to be short-circuited via the right-hand yoke legs 5" of the reluctance sensors 2, 2' arranged on different sides of the articulated chain 10. This operating condition of the chain sensor 1 has already been described in detail in connection with to FIG. 2A. With respect to the chain sensor 1 on the right-hand side of the device according to FIG. 3, the articulated chain 10 is arranged such that a chain gap is provided between the respective pairs of inner teeth 7 and outer teeth 8. Since at this position of the articulated chain 10, the magnetic resistances between the inner teeth 7 of the left-hand yoke legs 5' and the right-hand yoke legs 5" are substantially identical, the magnetic flux flows from the permanent magnets via the shorted magnetic circuits 13' and 14', so that the coils 6, 6' are substantially not flown through by a magnetic flux. Hence, no voltage is induced at the coils 6, 6' at this position of the articulated chain 10.

The device for measuring the chain elongation of a chain 10, which is shown in FIG. 3 and which comprises at least two chain sensors 1 including each at least one reluctance sensor 2, may additionally be equipped with temperature sensors, e.g. an infrared temperature sensor for measuring the temperature of the articulated chain 10 and an additional temperature sensor for measuring the temperature of the measurement device. By determining the temperature of the articulated chain 10 and of the measurement device, the temperature-dependent change of length of the articulated chain 10 can be taken into account when the chain elongation is being calculated and the change of chain elongation can be determined more precisely and more reliably. Furthermore, the measurement device according to FIG. 3 may additionally be equipped with an acceleration sensor or an alternative shock sensor. Making use of such sensors, various chain conditions occurring when the articulated chain 10 enters the measurement device, e.g. chain hinges that are displaced relative to one another or stiff chain hinges due to lack of lubrication, can be determined and taken into account upon calculating the chain elongation or the calculation of chain elongation can be interrupted.

Figure 4:
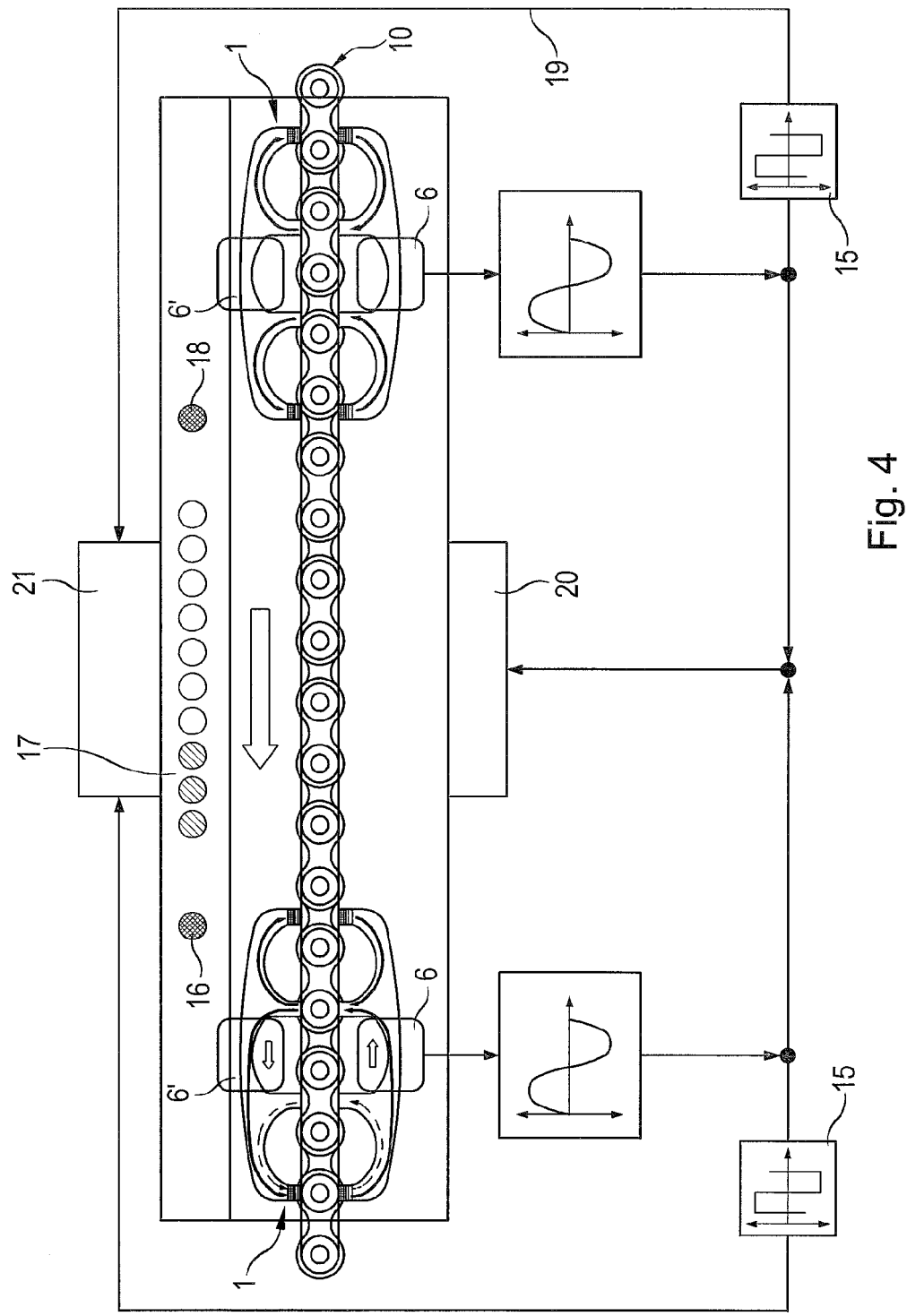
FIG. 4 the device according to FIG. 3 with a signal and power supply circuit.

FIG. 4 shows the incorporation of the measurement device according to FIG. 3 in a signal and power supply circuit. When the articulated chain 10 is operated in the chain running direction indicated by the contoured arrow, the movement of the articulated chain 10 through the two chain sensors 1 generates at the coils 6, 6' of the individual reluctance sensors 2, 2' an AC voltage whose magnitude and sign changes as the permanent magnetic circuits 13, 14 through the coils 6, 6' change.

The voltage generated by the coils 6, 6', which can be disposed in series or in parallel according to the demands on the measurement device, is fed to the signal and power supply circuit 19. From there it is directly transmitted to the power supply unit 20, the phase shift of the AC voltages generated by the two chain sensors 1 of the device being taken into account by the signal and power supply circuit 19, and to the control unit 21 via respective comparators 15 as a measurement signal. At the comparators 15 the AC voltage signal is differentiated so as to obtain a square-wave signal that it utilized in the control unit 21 for determining the chain elongation of the articulated chain 10. The differentiation of the AC voltage signal at the comparators 15 allows not only a precise temporal assignment of the change of the magnetic circuits 13, 14 flowing through the coils 6, 6' but also a determination of the speed of the articulated chain 10 via the period of the square-wave signal. It is thus possible to calculate in the control unit 21 an unequivocal measure for chain elongation via the interval between the switching pulses of the two chain sensors 1 in relation to the speed of the articulated chain 10 and the period of the square-wave signals, respectively.

Figure 1D:
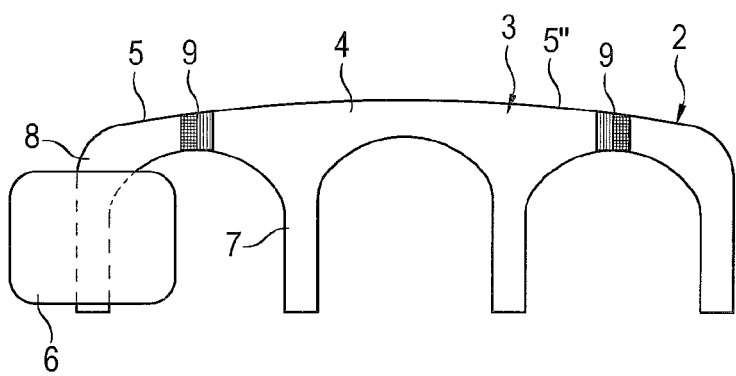
FIG. 1d a side view of a further embodiment of a chain sensor according to the present invention.

Even though the AC voltage generated at the coils 6, 6' of a chain sensor 1 with two reluctance sensors 2, 2' allows a simple structural design of the signal and power supply circuit 19, also the other embodiments of the reluctance sensors 2 shown in FIG. 1b to 1d and also the use of only one reluctance sensor 2 for the chain sensor 1 allow to provide, through the voltage signal, a voltage which is transmitted via the signal and power supply circuit 19 to the power supply unit 20 of the measurement device and which enables the measurement device to operate autarkically.

From a comparison between the chain elongation at the time in question and the original chain elongation stored in the control unit 21, the chain elongation of the articulated chain 10 at the time in question can be seen. Said chain elongation can continuously be indicated on the wear indicator 17 and, when a predetermined limit is exceeded, it can provide a warning via the emergency indicator 18 and/or interrupt the operation of the articulated chain 10. At the same time, the chain elongation can be used as a control variable for the synchronization of the chain 10 with respect to the driven components of the associated machines and industrial plants.

Through the AC voltage transmitted from the two chain sensors 1 to the power supply unit 20, the power required for operating the measurement device can be generated by the measurement device itself, i.e. the chain sensors 1 themselves. Hence, the device for measuring the chain elongation according to the present invention can also be used generically and already existing plants can be retrofitted with such a device without any complex modifications of said existing plants being necessary.

LIST OF REFERENCE NUMERALS 1 chain sensor
2, 2' reluctance sensors
3 yoke body
4 central leg
5 yoke legs
5' left-hand yoke leg
5" right-hand yoke leg
6, 6' coils
7 inner tooth
8 outer tooth
9 permanent magnets
10 articulated chain
11 chain hinges
12 chain link plates
113 magnetic circuit
13' shorted circuit
14 magnetic circuit
14' shorted circuit
15 comparator
16 operation indicator
17 wear indicator
18 emergency indicator
19 signal and power supply circuit
20 power supply unit
21 control unit

The invention claimed is:

1. A chain sensor comprising at least one first reluctance sensor with at least one coil, wherein said first reluctance sensor having a magnetically conductive yoke body comprising a central leg and two yoke legs extending laterally thereto, the yoke legs are each provided with at least two teeth said teeth of the yoke legs being adapted to be arranged in closely spaced relationship with a chain, and said first reluctance sensor including at least one permanent magnet.

2. The chain sensor as claimed in claim 1, wherein at least two permanent magnets are provided, said two permanent magnets being each arranged on a respective yoke leg.

3. The chain sensor as claimed in claim 2, wherein said two permanent magnets are arranged symmetrical with respect to the central leg.

4. The chain sensor as claimed in claim 2, wherein the at least two permanent magnets are arranged on the outer teeth of the yoke legs.

5. The chain sensor as claimed in claim 2, wherein the at least two permanent magnets arranged on the yoke legs have an identical pole direction in a direction towards the central leg.

6. The chain sensor as claimed in claim 1, wherein the at least one coil is arranged on the central leg.

7. The chain sensor as claimed in claim 1, wherein the at least one coil is arranged on one of the teeth of the yoke legs.

8. The chain sensor as claimed in claim 1, wherein a second reluctance sensor is provided, said second reluctance sensor has a magnetically conductive yoke body comprising a central leg and two yoke legs extending laterally thereto, each yoke leg is provided with two teeth facing the chain, said teeth being adapted to be arranged in closely spaced relationship with the chain and facing the first reluctance sensor.

9. The chain sensor as claimed in claim 8, wherein the lateral yoke legs of the first and second reluctance sensors are each provided with a permanent magnet, and wherein the permanent magnets on the yoke legs of the first reluctance sensor have an identical pole direction in a direction towards the central leg, whereas the permanent magnets on the yoke legs of the second reluctance sensor have an inverse pole direction.

10. The chain sensor as claimed in claim 9, wherein the permanent magnets being preferably arranged on the respective outer teeth of the yoke legs.

11. The chain sensor as claimed in claim 1 used for an articulated chain with a uniform pitch between the chain hinges, wherein the at least one first reluctance sensor is arranged perpendicularly to the hinge axes of the chain hinges on one side of the articulated chain, the teeth of the yoke legs of the first reluctance sensor facing the articulated chain.

12. The chain sensor as claimed in claim 11, wherein a second reluctance sensor is provided, which is arranged perpendicularly to the hinge axes of the chain hinges on an opposite side of the articulated chain, the teeth of the yoke legs of the second reluctance sensor facing the articulated chain.

13. The chain sensor as claimed in claim 12, wherein the distance between the associated teeth of the first and second reluctance sensors is at most 20% larger than the diameter of the chain hinges of the articulated chain.

14. The chain sensor as claimed in claim 13, wherein the distance between the associated teeth of the first and second reluctance sensors is at most 10% larger than the diameter of the chain hinges of the articulated chain.

15. The chain sensor as claimed in claim 11, wherein the distance between the outer tooth of one of the yoke legs and the inner tooth of the other yoke leg of the first or second reluctance sensor amounts substantially to an integer multiple of the pitch between the chain hinges of the articulated chain.

16. A device for measuring the chain elongation of a chain with at least two chain sensors as claimed in claim 1, said chain sensors being arranged along the chain in spaced relationship with one another and connected to a control unit for receiving and processing the signals of the two chain sensors, wherein the at least one coil provided on each chain sensor generates an alternating signal.

17. A method for measuring the chain elongation of a chain with at least two chain sensors which are arranged along the chain in spaced relationship with one another, each chain sensor comprising a magnetically conductive yoke body including a central leg and two yoke legs extending laterally thereto, the yoke legs being each provided with at least two teeth which face the chain, at least one coil arranged on the central leg, and at least two permanent magnets each arranged on a respective yoke leg, said method comprising:

forming two closed magnetic circuits via each chain sensor by means of the permanent magnets, one of the closed magnetic circuits flowing alternately through the at least one coil, whereas the respective other closed magnetic circuit is conducted via the chain sensor in short-circuit state;

moving the chain in a direction along the chain sensors;

periodically changing the magnetic circuits flowing through the at least one coil; and generating an AC voltage at the coils of the chain sensors.

18. A method for measuring the chain elongation of a chain with at least two chain sensors which are arranged along the chain in spaced relationship with one another, each chain sensor comprising a magnetically conductive yoke body including a central leg and two yoke legs extending laterally thereto, the yoke legs being each provided with at least two teeth which face the chain, at least one coil arranged on one of the teeth, and at least one permanent magnet, said method comprising:

forming two closed magnetic circuits of different reluctances via each chain sensor by means of the at least one permanent magnet, the at least one coil being at least temporarily flown through by the low-reluctance closed magnetic circuit;

moving the chain in a direction along the chain sensors;

periodically changing between the low-reluctance closed magnetic circuit and a high-reluctance closed magnetic circuit, which flow through the at least one coil; and generating a voltage change at the coils of the chain sensors.

* * * * *